United States Patent
Horiuchi (10) Patent No.: US 6,974,144 B2
(45) Date of Patent: Dec. 13, 2005

(54) BICYCLE FRONT END ARRANGEMENT FORMING ELECTRIC POWER SUPPLY SYSTEM

(75) Inventor: Noriyuki Horiuchi, Higashiosaka (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/857,878

(22) Filed: Jun. 2, 2004

(65) Prior Publication Data

US 2004/0262065 A1    Dec. 30, 2004

(30) Foreign Application Priority Data

Jun. 27, 2003   (JP) .............................. 2003-185458

(51) Int. Cl.⁷ ............................................... B62K 1/00
(52) U.S. Cl. ..................... 280/276; 280/279; 310/67 A
(58) Field of Search ............................... 280/276, 279, 280/280, 281.1, 288.4, 270; 310/67 A; 439/36

(56) References Cited

U.S. PATENT DOCUMENTS

| | | | | |
|---|---|---|---|---|
| 4,559,462 A | * | 12/1985 | Hernandez-Badillo | .... 310/67 A |
| 6,095,542 A | * | 8/2000 | Allen | .......................... 280/276 |
| 6,118,196 A | * | 9/2000 | Cheng-Yon | ............... 310/75 C |
| 6,409,197 B1 | * | 6/2002 | Endo et al. | ............... 280/288.4 |
| 6,600,411 B2 | * | 7/2003 | Nishimoto | ................... 340/432 |
| 6,609,722 B1 | * | 8/2003 | Miyoshi et al. | ............. 280/280 |

FOREIGN PATENT DOCUMENTS

| | | | | |
|---|---|---|---|---|
| DE | 19832348 | * | 10/1999 | ............. B62J 6/00 |
| EP | 1 188 655 A2 | | 3/2002 | |
| EP | 1 270 389 A2 | | 1/2003 | |
| JP | 2001-213104 A | | 8/2001 | |
| JP | 2002-79979 | * | 3/2002 | .......... B62K 25/08 |
| JP | 2003-9449 A | | 1/2003 | |

* cited by examiner

Primary Examiner—Tony Winner
(74) Attorney, Agent, or Firm—Shinjyu Global IP Counselors, LLP (57) ABSTRACT

A bicycle front fork is configured to reduce the risk that a poor connection occurs in a lead wire connecting an electricity generating mechanism to an electric device for ensuring reliable delivery of electric power to the electric device. The front fork has first and second fork blades, a fork crown, and a fork stem. The first and second fork blades are electrically connected to first and second electrodes, respectively. A front lamp is mounted to the fork crown. The fork crown has a spacer that electrically insulates the first fork blade and the second fork blade. The first fork blade has an attaching part where an end part of a cable extending from the electric device mounted to the fork crown can be attached.

20 Claims, 4 Drawing Sheets

BICYCLE FRONT END ARRANGEMENT FORMING ELECTRIC POWER SUPPLY SYSTEM

BACKGROUND OF THE INVENTION

1. Field of the Invention

The present invention generally relates to a bicycle front end arrangement having a bicycle electric power supply system with a bicycle front fork and a bicycle hub. More particularly, the present invention relates to a bicycle front fork having first and second fork blades connected to both axially facing ends of the bicycle hub that is equipped with an electricity generating mechanism having first and second electrodes or electrical connections.

2. Background Information

A bicycle is generally provided with a frame that constitutes the body framework of the bicycle and a front fork that is connected in a freely rotatable manner to a front end portion of the frame. The front fork basically comprises a pair of fork blades, a fork crown, and a fork stem. The two fork blades are arranged on both sides of the front wheel with the tip end portions of the fork blades being connected to a front hub arranged on the rotational center of the front wheel. The fork crown is connected to the base end portions (i.e., opposite ends from the tip end portions) of the fork blades. The fork stem is connected to the fork crown, and is arranged to extend upwardly form the fork crown. The fork stem is supported on the front end portion of the frame in a freely rotatable manner.

Such conventional bicycles as that just described are sometimes provided with a front lamp or other electric device mounted to the front fork and an electricity generating mechanism installed in the front hub for supplying electric power to the electric device. Such bicycles are usually fitted with a lead-wire-containing cable that runs along the front fork from the electricity generating mechanism to the electric device. The electricity generating mechanism generates electricity using the rotation of the front wheel and the electric power is delivered to the electric device through the lead wire (see for example, Japanese Laid-Open Patent Publication No. 2001-213104).

In such bicycles, the electricity generating mechanism has two electrodes. One of the electrodes of the electricity generating mechanism is connected to one of the electrodes of the electric device by the lead wire and the other electrode of the electricity generating mechanism is connected to the other electrode of the electric device by the front hub and the front fork that functions as ground.

In view of the above, it will be apparent to those skilled in the art from this disclosure that there exists a need for an improved bicycle front end arrangement. This invention addresses this need in the art as well as other needs, which will become apparent to those skilled in the art from this disclosure.

SUMMARY OF THE INVENTION

In the conventional bicycles described above, the lead wire is typically arranged so as to be exposed to the outside over a comparatively long distance from the electricity generating mechanism to the electric device. Consequently, there is a high risk that the lead wire will become caught on an object and broken or that a poor connection will result from the intrusion of moisture, thus interrupting the supply of electric power to the electric device.

One object of the present invention is to provide a bicycle front end arrangement that reduces the risk that a poor connection will occur in the lead wire that connects an electricity generating mechanism to an electric device arranged on a front portion of a bicycle and to ensure that the electric power is delivered reliably to the electric device.

In accordance with one aspect of the present invention, a bicycle front fork arrangement is provided with a first fork blade, a second fork blade, a fork crown and a fork stem. The first fork blade is formed of an electrically conductive material. The first fork blade has a first upper base end portion, a first lower tip end portion and a lead wire attaching structure.

The second fork blade is formed of an electrically conductive material. The second fork blade has a second upper base end portion and a second tip end portion. The fork crown has first and second connecting parts connected to the first and second base end portions of the first and second fork blades. The fork crown is configured to insulate the first and second fork blades from each other. The fork stem is connected to the fork crown to support the fork crown in a rotated freely with respect to a frame of a bicycle.

With this bicycle front fork, the first electrode or electrical connection is electrically connected to the electric device through the first fork blade and the fork stem and the second electrode or electrical connection is electrically connected to the electric device through the second fork blade and the lead wire. The two fork blades are insulated from each other by the fork stem. Therefore, when the electricity generating mechanism generates electricity, the electrical current from the first and second electrodes or electrical connections is delivered to the electric device through the two fork blades, which are insulated from each other.

With this arrangement, the two fork blades can be used in place of lead wires and the length of the lead wire from the electric device can be shortened. As a result, the risk of a poor connection occurring in the lead wire is reduced and the electric power can be delivered more reliably to the electric device.

In accordance with a second aspect of the present invention, the bicycle front fork of the first aspect of the present invention is configured such that the bicycle front fork is further provided with a spacer member. The spacer member is made of a material having an insulating quality and arranged between the first fork blade and the first connecting part of the fork crown. The bicycle front fork insulates the two fork blades by the spacer member having an insulating quality.

In accordance with a third aspect of the present invention, a bicycle hub mounted to a bicycle front fork having first and second fork blades and comprises a hub shaft, a cylindrical member, and an electricity generating mechanism. The ends of the hub shaft are fastened to the tip end portions of the first and second fork blades. The cylindrical member is connected to the front wheel of the bicycle and mounted such that it rotates freely about the hub shaft. The electricity generating mechanism is arranged between the hub shaft and the cylindrical member, has a first electrode or electrical connection and a second electrode or electrical connection, and is configured such that the first electrode or electrical connection can be electrically connected to the first fork blade. The hub shaft has a shaft part and an insulating part. The shaft part is arranged so as to extend from the first fork blade to the second fork blade and configured such that it can be electrically connected to the second electrode or electrical connection. The insulating part is mounted to the shaft part and serves to insulate the shaft part and the first fork blade from each other.

With this bicycle hub, the cylindrical member rotates integrally with the front wheel and the electricity generating mechanism generates electricity when the cylindrical member rotates relative to the hub shaft. The first electrode or electrical connection is electrically connected to the first fork blade, and the second electrode is electrically connected to the second fork blade through the shaft part. The first fork blade and the shaft part are insulated from each other by the insulating part. Therefore, the electric power generated by the electricity generating mechanism is delivered to the electric device (which is mounted to the front fork) through the two fork blades (which are insulated from each other).

With this arrangement, the length of the lead wire from the electric device can be shortened because the electricity generating mechanism and the electric device can be electrically connected through the fork blades. A bicycle hub in accordance with a fourth aspect of the present invention is a bicycle hub as described in the first aspect of the present invention, provided with a cylindrical member, a first flange, and a second flange. The first flange is formed on the end portion of the bicycle hub that is closer to the first fork blade. The second flange is formed on the end portion of the bicycle hub that is closer to the second fork blade. The insulating part of the hub shaft is arranged between the first flange and the first fork blade, is configured such that the shaft part can be passed there-through in the axial direction, and is provided with a brim and a trunk. The brim extends radially outward from the end portion of the insulating part that is closer to the second fork blade. The trunk runs from the brim to the end portion of the insulating part that is closer the first fork blade. This bicycle hub is also provided with an electrically connecting member. The electrically connecting member is an annular member that fits over the trunk of the insulating member, is connected to the first electrode of the electricity generating mechanism through a lead wire, and is configured such that it can abut against the first fork blade.

With this bicycle hub, the first electrode is electrically connected to the first fork blade through the electrically connecting member and the first and second electrodes are insulated from each other because the electrically connecting member abuts against the brim of the insulating part and is thus not in contact with the shaft part.

A bicycle electric power supply system in accordance with a fifth aspect of the present invention is provided with a bicycle front fork and a bicycle hub. The bicycle front fork is as described in the first or second aspect of the present invention. The bicycle hub is as described in the third or fourth aspect of the present invention. The first electrode of the electricity generating mechanism is connected to the electric device through the first fork blade and a lead wire extending from the electric device. The second electrode of the electricity generating mechanism is connected to the electric device through the shaft part, the second fork blade and the fork crown.

With this bicycle electric power supply system, the electric power generated by the electricity generating mechanism is delivered to the electric device through the two fork blades, which are insulated from each other. Since the two fork blades can be used in place of lead wires, the length of the lead wire can be shortened. As a result, the risk of a poor connection occurring is reduced and the electric power can be delivered reliably to the electric device.

A bicycle electric power supply system in accordance with a sixth aspect of the present invention is a bicycle electric power supply system as described in the fifth aspect of the present invention, wherein the electric device is mounted to the fork crown. The attaching part of the first fork blade is provided on the base end portion of the first fork blade.

With this bicycle electric power supply system, the attaching part of the first fork blade is provided on the base end portion close to the fork crown. As a result, the length of the lead wire can be minimized.

A bicycle electric power supply system in accordance with a seventh aspect of the present invention is a bicycle electric power supply system as described in the fifth or sixth aspect of the present invention, wherein the electric device is a bicycle front lamp. The first fork blade can be electrically connected to the bicycle front lamp through a lead wire extending from the electric device and the second fork blade can be electrically connected to the bicycle front lamp through the fork crown.

With this bicycle electric power supply system, the length of the lead wire is shortened and the risk of a poor connection occurring is reduced in the particular case of when the electric device is a bicycle front lamp.

With the present invention, two fork blades that are insulated from each other are provided on a front portion of the bicycle. As a result, the two fork blades can be used in place of lead wires and the length of the lead wire from the bicycle-mounted electric device can be shortened. As a result, the risk of a poor connection occurring in the lead wire is reduced and the electric power can be delivered more reliably to the electric device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
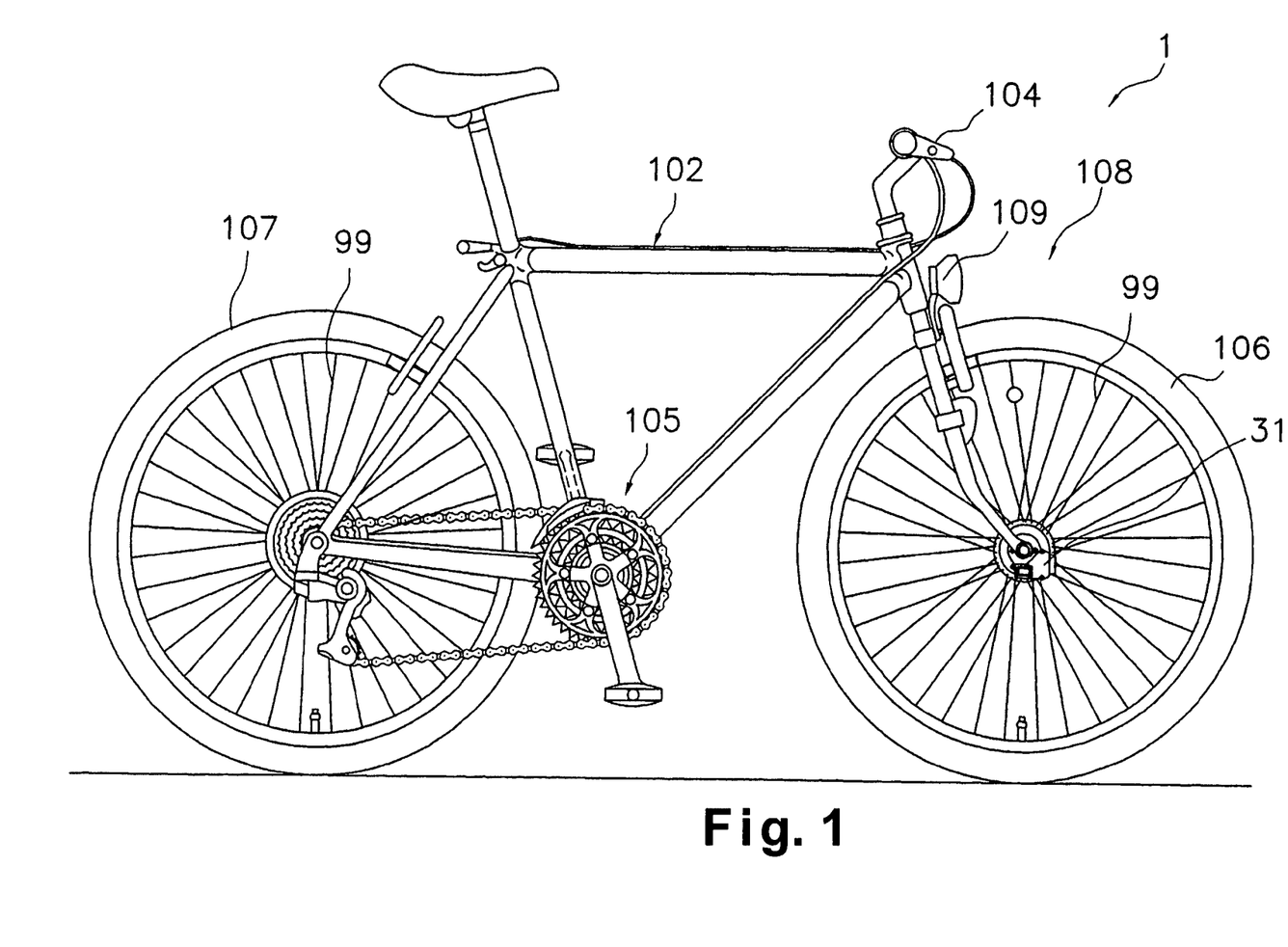
FIG. 1 is a side elevational view a bicycle provided with a bicycle front end arrangement that is equipped an electric power supply system in accordance with one embodiment of the present invention.

Referring initially to FIG. 1, a bicycle 1 is illustrated with a bicycle front end arrangement that is equipped an electric power supply system 108 in accordance with one embodiment of the present invention. Basically, the bicycle 1 includes a frame 102, a handlebar 104, a drive section 105 (a chain, pedals, etc.), a pair of wheels 106 and 107 with a plurality of spokes 99, and an electric power supply system 108 for delivering electric power to a front lamp 109.

Figure 2:
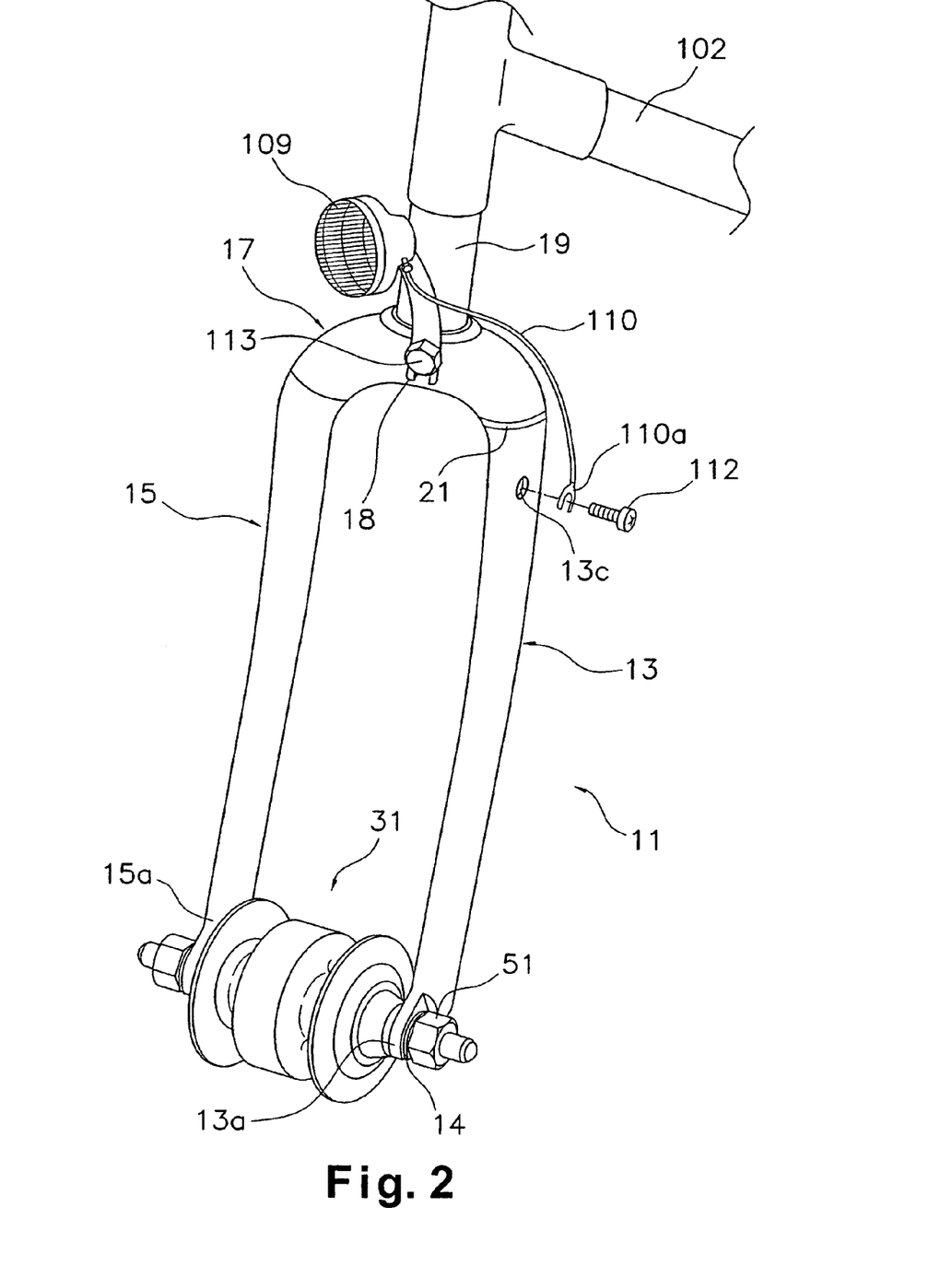
FIG. 2 is a front perspective view of the bicycle front end arrangement having a bicycle front fork and a bicycle front hub that are configured with the bicycle electric power supply system in accordance with the present invention.

As shown in FIG. 2, the front lamp 109 is mounted to the front fork 11 (described later) of the electric power supply system 108. The front lamp 109 has two electrodes. From one of the electrodes extends a cable 110 with a lead wire for receiving electric power from the first electrode of a generator 39 of the hub 31. The tip end portion of the lead wire has a terminal 110a comprising an electrically conductive portion exposed to the outside. The other electrode of the front lamp 109 is electrically connected to the fork crown 17 of the front fork 11 and grounded. For example, the other electrode of the front lamp 109 is electrically connected to the fork crown 17 of the front fork 11 by the mounted bracket of the front lamp 109.

Figure 3:
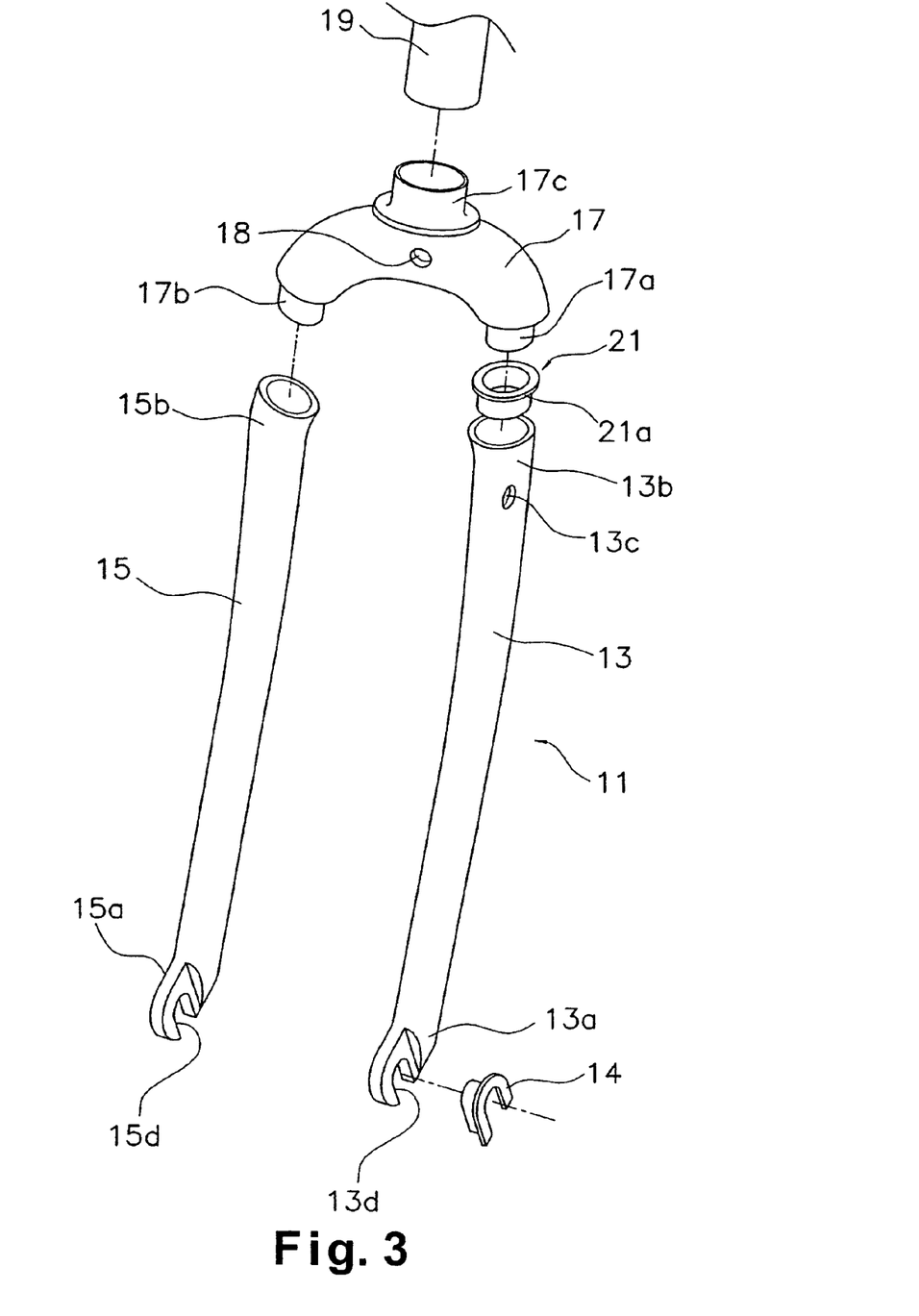
FIG. 3 is an exploded perspective view of the front fork that is configured to form part of the bicycle electric power supply system in accordance with the present invention.

As shown in FIGS. 2 and 3, the electric power supply system 108 comprises a front fork 11 connected in a freely rotational manner to a front end portion of the frame 102 and a front hub 31 that is connected to the front fork 11 and to which the spokes 99 of the front wheel 106 are connected.

The front fork 11 basically comprises first and second electrically conductive fork blades 13 and 15, a fork crown 17, and a fork stem 19. The first and second fork blades 13 and 15 are made of a metal or other electrically conductive material and arranged on both sides of the front wheel 106. The tip end portions 13a and 15a of both the fork blades 13 and 15 are provided mounting openings 13d and 15d for mounting the ends of the hub shaft 33 of the front hub 31.

An insulating member 14 is installed in the mounting opening 13d of the first fork blade 13 for electrically insulating a shaft part 34 (discussed later) of the front hub 31 from the first fork blade 13. The base end portion 13b of the first fork blade 13 is connected in a fixed manner with an adhesive or other means to the first connecting part 17a (discussed later) with the spacer 21 (discussed later) of the fork crown 17 disposed therebetween. An attaching hole 13c is provided in the base end portion 13b of the first fork blade 13 for attaching the terminal 110c of the cable 110 with a screw 112.

The base end portion 15b of the second fork blade 15 is connected in a fixed manner with an adhesive or other means to the second connecting part 17b of the fork crown 17.

The fork crown 17 is made of a metal or other electrically conductive material (except for the spacer 21 discussed later), and includes first to third connecting parts 17a to 17c and a mounting hole 18. The first and second connecting parts 17a and 17b are connected to the base end portions 13b and 15b of the first and second fork blades 13 and 15, respectively. The third connecting part 17c is connected to the fork stem 19. The mounting hole 18 is a hole through which is passed a screw 113 for mounting the front lamp 109 to the fork crown 17. The fork crown 17 also includes the spacer 21, which is a separate entity. The spacer 21 is made of a ceramic or other insulating material and is configured such that it can fit around or inside of the first connecting part 17a of the fork crown 17 and the base end portion 13b of the first fork blade 13. The spacer 21 has a brim 21a that protrudes radially outward and serves to electrically insulate the first fork blade 13 and the fork crown 17 from each other.

The fork stem 19 is made of a metal or other electrically conductive material and is arranged in a generally vertical orientation. The bottom end of the fork stem 19 is connected to the fork crown 17, the top end is connected to the handle bar 104, and the middle portion is connected in a freely rotatable manner to a front end portion of the frame 102.

Figure 4:
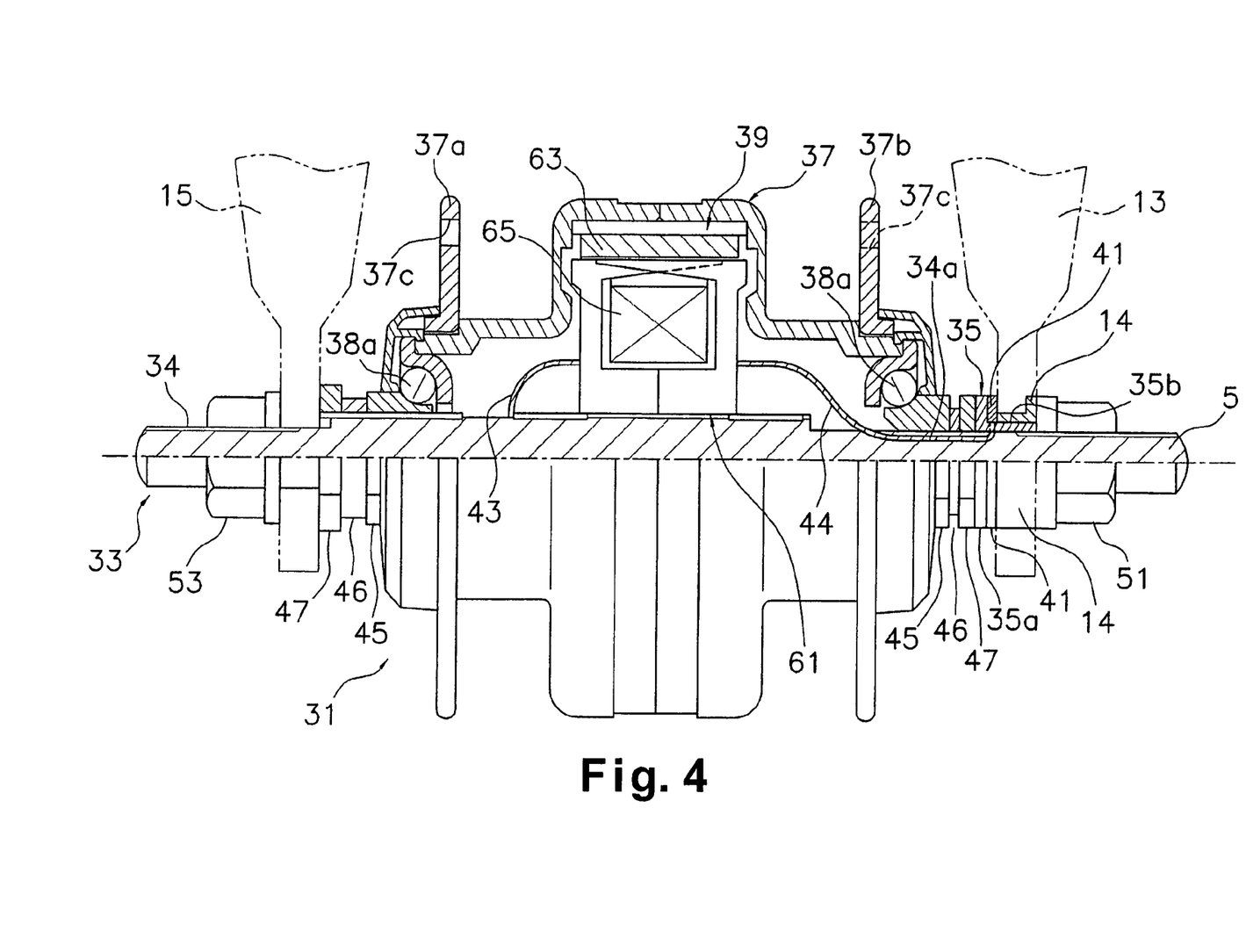
FIG. 4 is a partial longitudinal cross sectional view of the front hub of that is configured to form part of the bicycle electric power supply system in accordance with the present invention.

As shown in FIG. 4, the front hub 31 comprises a hub shaft 33, a cylindrical member 37, a generator 39 and an electrically connecting member 41.

The hub shaft 33 has a shaft part 34 and an insulating part 35 arranged on the side closer to the first fork blade 13. The shaft part 34 is made of an electrically conductive material. The shaft part 34 is arranged such that the two end portions thereof extend outward beyond the fork blades 13 and 15, respectively. The shaft part 34 is fastened to the mounting openings 13d and 15d with nuts 51 and 53. The nuts 51 and 53 are made of an electrically conductive material. The shaft part 34 is connected to the second electrode of the generator 39 through a cable 43 that forms an electrical connection. Two bearings 38 are arranged between the cylindrical member 37 and the hub shaft 33 and a ball pushing nut 45 for pushing against the balls 38a of the bearing 38, a washer 46, and a rotation preventing nut 47. The rotation preventing nut 47 are installed on the shaft part 34 at each of the two locations where the bearings 38 are arranged. These members 45 to 47 are all made of electrically conductive materials. The hub shaft 34 is provided with a cable guide hole 34a (discussed later) in which a cable 44 that forms an electrical connection from the generator 39 is arranged. Thus, the cable 44 has an insulating sheath and an inner electrical wire that is electrically coupled between the generator 39 and the electrically connecting member 41. Thus, the end of the cable 44 opposite the generator 39 forms a front fork blade contact. This fork blade contact is electrically connected to the generator 39 and insulated from the first mounting end of the electrically conductive shaft part of the hub shaft 5.

The insulating member 35 is made of a ceramic or other insulating material. The insulating member 35 includes a brim 35a and a cylindrical trunk 35b. The brim 35a is formed such that it extends radially outward from the end portion of the cylindrical trunk 35b that is closer to the second fork blade 15. The cylindrical trunk 35b runs from the brim 35a toward the first fork blade 13. The brim 35a serves to electrically insulate the rotation preventing nut 47 from the electrically connecting member 41. The shaft part 34 is extends axially through the inside of the trunk 35b.

The cylindrical member 37 is mounted such that it rotates freely about the hub shaft 33 and has radially outwardly protruding first and second flanges 37a and 37b on both its axially facing end portions. The flanges 37a and 37b has plurality of attaching holes 37c for attaching the radially inside ends of the spokes 99 of the front wheel 106.

The generator 39 is arranged inside the cylindrical member 37 and includes an inner stator 61 that is fixed to the hub shaft 33 and an outer rotor 63 that is fixed to the cylindrical member 37 and arranged to face the inner stator 61. The inner stator 61 has a bobbin 65 onto which a coil (not shown in figures) is wound, and the two ends (first and second electrodes) of the coil are drawn out from both axially facing sides of the bobbin 65 and connected to the cables 44 and 43, respectively. The outer rotor 63 comprises chiefly a plurality of permanent magnets (not shown in the figures) arranged in a circular fashion.

The electrically connecting member 41 is made of an electrically conductive material and has an annular in shape. The electrically connecting member 41 is configured such that the trunk 35b of the insulating member 35 can be inserted through the inside thereof. The electrically connecting member 41 is arranged such that it is sandwiched between the insulating member 35 and the axially facing of the first fork blade 13. The electrically connecting member 41 is fixed to the trunk 35b of the insulating member 35 using an adhesive, pressure fitting, a screw, or other well-known method. One end of the cable 44 is connected to the inside of the electrically connecting member 41, and thus, the electrically connecting member 41 is electrically connected to the first electrode of the generator 39 through the cable 44.

Thus, in this electric power supply system 108, the first electrode of the generator 39 is electrically connected to the front lamp 109 through the cable 44, the electrically connecting member 41, the first fork blade 13, and the cable 110. Also in this electric power supply system 108, the second electrode of the generator 39 is connected to the front lamp 109 through the cable 43, the shaft part 34, the second fork blade 15, and the fork crown 17. The two fork blades 13 and 15 are electrically insulated from each other in this front fork 11 because the spacer 21 electrically insulates the first fork blade 13 from the fork crown 17. In the front hub 31, the insulating member 14 electrically insulates the first fork blade 13 from the nut 51 and the insulating member 35 electrically insulates the rotation preventing nut 47 from the electrically connecting member 41.

With this system 108, when the front wheel 106 rotates, the cylindrical member 37 of the front hub 31 rotates integrally with the front wheel 106 and the outer rotor 63 and the inner stator 61 of the generator 39 rotate relative to each other to generate electricity. Then, the electric power from the first and second electrodes of the generator 39 is delivered to the front lamp 109 through the two fork blades 13 and 15, which are insulated from each other. The electric current from the second electrode functions as ground in this embodiment.

Thus, with this system 108, the two fork blades 13 and 15 are used as lead wires and the length of the cable 110 is shortened. As a result, with this system 108, the risk of a poor connection occurring in the cable 110 is reduced and the electric power can be delivered more reliably to the front lamp 109.

In particular, with this system 108, the length of the cable 110 is held to a minimum because the attaching hole 13c for attaching the cable 110 is provided closely adjacent to the fork crown 17, on which the front lamp 109 is mounted.

Additionally, with this system 108, it is not necessary to prepare any new parts to replace the lead wires because the two fork blades 13 and 15, which are already used as component parts of the bicycle 1, are used as lead wires.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Moreover, the terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-185458. The entire disclosure of Japanese Patent Application No. 2003-185458 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. For example, the bicycle electric power supply system of the present invention is not limited to from lamp applications. It can also be applied to other electric devices, such as a gear indicator provided with a display. Also, the fork crown is not limited to a configuration in which the spacer is a separate entity. It is also acceptable for to have an insulating portion formed integrally with the electrically conductive portion. In addition, the bicycle hub is not limited to the nut-fastened type described in the embodiment; it is also acceptable to use a quick release arrangement. In such a case, the shaft part of the hub shaft is a hollow member with a passage running in the axial direction.

Furthermore, the foregoing descriptions of the embodiments according to the present invention are provided for illustration only, and not for the purpose of limiting the invention as defined by the appended claims and their equivalents.

What is claimed is:

1. A bicycle front end arrangement comprising:
   a first fork blade formed of an electrically conductive material and having a first upper base end portion, a first lower tip end portion and a lead wire attaching structure;
   a second fork blade formed of an electrically conductive material and having a second upper base end portion and a second tip end portion;
   a fork crown having first and second connecting parts connected to the first and second base end portions of the first and second fork blades, and the fork crown being made of an electrically conductive material and being configured to insulate the first and second fork blades from each other; and
   a fork stem connected to the fork crown to support the fork crown in a freely rotatable manner with respect to a frame of a bicycle.

2. The bicycle front end arrangement as recited in claim 1, wherein
   the fork crown includes an electric device mounting structure configured and arranged to mount an electric device thereon.

3. A bicycle front end arrangement comprising:
   a first fork blade formed of an electrically conductive material and having a first upper base end portion, a first lower tip end portion and a lead wire attaching structure;
   a second fork blade formed of an electrically conductive material and having a second upper base end portion and a second tip end portion;
   a fork crown having first and second connecting parts connected to the first and second base end portions of the first and second fork blades, and the fork crown being configured to insulate the first and second fork blades from each other; and
   a fork stem connected to the fork crown to support the fork crown in a freely rotatable manner with respect to a frame of a bicycle,
   the fork crown including an insulating spacer member that is arranged between the first fork blade and the first connecting part.

4. The bicycle front end arrangement as recited in claim 3, wherein the second connecting part of the fork crown is made of an electrically conductive material that electrically contacts the second fork blade.

5. The bicycle front end arrangement as recited in claim 3, wherein
the fork crown includes an electric device mounting structure configured and arranged to mount an electric device thereon.

6. The bicycle front end arrangement as recited in claim 5, wherein
the second connecting part of the fork crown is made of an electrically conductive material that electrically contacts the second fork blade.

7. The bicycle front end arrangement as recited in claim 6, wherein
the first lower tip end portion of the first fork blade has an insulating member configured to insulate the first lower tip end portion of the first fork blade from an axle of a hub to be mounted thereto.

8. A bicycle front end arrangement comprising:
a first fork blade formed of an electrically conductive material and having a first upper base end portion, a first lower tip end portion and a lead wire attaching structure;
a second fork blade formed of an electrically conductive material and having a second upper base end portion and a second tip end portion;
a fork crown having first and second connecting parts connected to the first and second base end portions of the first and second fork blades, and the fork crown being configured to insulate the first and second fork blades from each other; and
a fork stem connected to the fork crown to support the fork crown in a freely rotatable manner with respect to a frame of a bicycle,
the second connecting part of the fork crown being made of an electrically conductive material that electrically contacts the second fork blade.

9. A bicycle front end arrangement comprising:
a first fork blade formed of an electrically conductive material and having a first upper base end portion, a first lower tip end portion and a lead wire attaching structure;
a second fork blade formed of an electrically conductive material and having a second upper base end portion and a second tip end portion;
a fork crown having first and second connecting parts connected to the first and second base end portions of the first and second fork blades, and the fork crown being configured to insulate the first and second fork blades from each other; and
a fork stem connected to the fork crown to support the fork crown in a freely rotatable manner with respect to a frame of a bicycle,
the first lower tip end portion of the first fork blade having an insulating member configured to insulate the first lower tip end portion of the first fork blade from an axle of a hub to be mounted thereto.

10. A bicycle hub comprising:
a hub shaft including an electrically conductive shaft part and an insulating part disposed on the electrically conductive shaft part, the electrically conductive shaft part of the hub shaft having a first mounting end configured to be fastened to a first tip end portion of a first fork blade and a second mounting end configured to be fastened to a second tip end portion of a second fork blade, the insulating part of the hub shaft being configured to insulate the first mounting end of the electrically conductive shaft part from the first fork blade;
a cylindrical member rotatably mounted on the hub shaft such that the cylindrical member rotates freely about the hub shaft; and
an electricity generating mechanism arranged between the hub shaft and the cylindrical member, the electricity generating mechanism including a first electrical connection and a second electrical connection,
the first electrical connection extending from the electricity generating mechanism to the first mounting end of the electrically conductive shaft part of the hub shaft to form a first fork blade contact that is electrically connected to the electricity generating mechanism and insulated from the first mounting end of the electrically conductive shaft part of the hub shaft,
the second electrical connection extending from the electricity generating mechanism to the electrically conductive shaft part of the hub shaft such that the second mounting end of the electrically conductive shaft part of the hub shaft is electrically connected between the electricity generating mechanism and the second mounting end of the electrically-conductive shaft part of the hub shaft.

11. The bicycle hub as recited in claim 10, wherein
the insulating part of the hub shaft is a generally tubular member that is configured such that the first mounting end of the electrically conductive shaft part can be passed therethrough in the axial direction, and
the insulating part of the hub shaft includes an annular brim and a trunk with the annular brim extending radially outward from an end portion of the trunk that is closer to the cylindrical member and the trunk extending axially from the brim to an end portion that is distal relative to the cylindrical member.

12. The bicycle hub as recited in claim 11, wherein
the first electrical connection of the electricity generating mechanism further includes an annular electrically connecting member disposed on the insulating part of the hub shaft, the annular electrically connecting member being electrically connected to the first fork blade contact of the first electrical connection of the electricity generating mechanism.

13. The bicycle hub as recited in claim 10, wherein
the first electrical connection of the electricity generating mechanism further includes an annular electrically connecting member disposed on the insulating part of the hub shaft, the annular electrically connecting member being electrically connected to the first fork blade contact of the first electrical connection of the electricity generating mechanism.

14. A bicycle electric power supply system comprising:
a bicycle front fork arrangement including
a first fork blade formed of an electrically conductive material and having a first upper base end portion, a first lower tip end portion and a lead wire attaching structure,
a second fork blade formed of an electrically conductive material and having a second upper base end portion and a second tip end portion,
a fork crown having first and second connecting parts connected to the first and second base end portions of the first and second fork blades, and the fork crown being configured to insulate the first and second fork blades from each other, and a fork stem connected to the fork crown to support the fork crown in a freely rotatable manner with respect to a frame of a bicycle, and a bicycle hub including a hub shaft including an electrically conductive shaft part and an insulating part disposed on the electrically conductive shaft part, the electrically conductive shaft part of the hub shaft having a first mounting end configured to be fastened to a first tip end portion of a first fork blade and a second mounting end configured to be fastened to a second tip end portion of a second fork blade, the insulating part of the hub shaft being configured to insulate the first mounting end of the electrically conductive shaft part from the first fork blade, a cylindrical member rotatably mounted on the hub shaft such that the cylindrical member rotates freely about the hub shaft, and an electricity generating mechanism arranged between the hub shaft and the cylindrical member, the electricity generating mechanism including a first electrical connection and a second electrical connection, the first electrical connection extending from the electricity generating mechanism to the first mounting end of the electrically conductive shaft part of the hub shaft to form a first fork blade contact that is electrically connected to the electricity generating mechanism and insulated from the first mounting end of the electrically conductive shaft part of the hub shaft, the second electrical connection extending from the electricity generating mechanism to the electrically conductive shaft part of the hub shaft such that the second mounting end of the electrically conductive shaft part of the hub shaft is electrically connected between the electricity generating mechanism and the second mounting end of the electrically conductive shaft part of the hub shaft, the first electrical connection of the electricity generating mechanism being configured to be connected to an electric device through the first fork blade and a lead wire extending from the electric device to the lead wire attaching structure of the first fork blade, and the second electrical connection of the electricity generating mechanism being configured to be connected to the electric device through the shaft part, the second fork blade and the fork crown.

15. The bicycle electric power supply system as recited in claim 14, wherein the fork crown includes an electric device mounting structure; and the first upper base end portion of the first fork blade includes the lead wire attaching structure of the first fork blade.

16. The bicycle electric power supply system as recited in claim 15, wherein the electric device is a bicycle front lamp;

the first fork blade is electrically connected to the bicycle front lamp through a lead wire extending from the electric device; and the second fork blade is electrically connected to the bicycle front lamp through the fork crown.

17. The bicycle electric power supply system as recited in claim 14, wherein the electric device is a bicycle front lamp;

the first fork blade is electrically connected to the bicycle front lamp through a lead wire extending from the electric device; and the second fork blade is electrically connected to the bicycle front lamp through the fork crown.

18. The bicycle electric power supply system as recited in claim 14, wherein the fork crown includes an insulating spacer member that is arranged between the first fork blade and the first connecting part.

19. The bicycle electric power supply system as recited in claim 14, wherein the insulating part of the hub shaft is a generally tubular member that is configured such that the first mounting end of the electrically conductive shaft part can be passed therethrough in the axial direction, and the insulating part of the hub shaft includes an annular brim and a trunk with the annular brim extending radially outward from an end portion of the trunk that is closer to the cylindrical member and the trunk extending axially from the brim to an end portion that is distal relative to the cylindrical member.

20. The bicycle electric power supply system as recited in claim 14, wherein the first electrical connection of the electricity generating mechanism further includes an annular electrically connecting member disposed on the insulating part of the hub shaft, the annular electrically connecting member being electrically connected to the first fork blade contact of the first electrical connection of the electricity generating mechanism.

* * * * *